US008976279B2

United States Patent
Tatsuzawa et al.

(10) Patent No.: US 8,976,279 B2
(45) Date of Patent: Mar. 10, 2015

(54) LIGHT RECEIVER, METHOD AND TRANSMISSION SYSTEM WITH TIME VARIABLE EXPOSURE CONFIGURATIONS

(71) Applicant: Kabushiki Kaisha Toshiba, Tokyo (JP)

(72) Inventors: Yukiyasu Tatsuzawa, Yokohama (JP); Kazuhiro Hiwada, Yokohama (JP); Tatsuji Ashitani, Yokohama (JP); Jun Deguchi, Kawasaki (JP); Hideaki Majima, Tokyo (JP); Motohiro Morisaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 13/762,740

(22) Filed: Feb. 8, 2013

(65) Prior Publication Data

US 2013/0271631 A1    Oct. 17, 2013

(30) Foreign Application Priority Data

Apr. 13, 2012   (JP) ................... 2012-092358

(51) Int. Cl.
*H04N 5/238*   (2006.01)
*H04N 5/235*   (2006.01)
*H04N 5/232*   (2006.01)
*H04N 5/335*   (2011.01)

(52) U.S. Cl.
CPC .......... *H04N 5/2353* (2013.01); *H04N 5/23219* (2013.01)
USPC ............ 348/296; 348/276; 348/297; 348/308

(58) Field of Classification Search
USPC .................. 348/302, 311, 296–297, 308, 364
See application file for complete search history.

(56) References Cited

U.S. PATENT DOCUMENTS

| 5,262,871 | A  | * | 11/1993 | Wilder et al. ................ 348/307 |
| 6,977,685 | B1 | * | 12/2005 | Acosta-Serafini et al. ... 348/308 |
| 7,283,167 | B1 | * | 10/2007 | Schrey et al. ................ 348/308 |
| 7,859,582 | B2 | * | 12/2010 | Gomi ........................... 348/308 |
| 8,040,417 | B2 | * | 10/2011 | Asahi ........................... 348/302 |

(Continued)

FOREIGN PATENT DOCUMENTS

JP    2007-151143    6/2007
KR    10-2008-0043701 A    5/2008

OTHER PUBLICATIONS

Office Action issued Mar. 6, 2014 in Korean Patent Application No. 10-2013-18376 (with English language translation).

*Primary Examiner* — Ngoc-Yen Vu
(74) *Attorney, Agent, or Firm* — Oblon, McClelland, Maier & Neustadt, L.L.P.

(57) ABSTRACT

According to one embodiment, a light receiver includes a light reception module, a multi-exposure area selector, a multi-exposure controller, and a readout module. The light reception module includes N lines, each of the N lines having a plurality of light receiving elements. The multi-exposure area selector is configured to select one or a plurality of single-exposure lines and one or a plurality of multi-exposure lines. The multi-exposure controller is configured to, per the unit time, perform an exposure on the single-exposure lines one time for a first exposure time; and a first exposure and a second exposure on the multi-exposure lines. The readout module is configured to read exposure amounts of the lines line by line. The multi-exposure controller is configured to start the second exposure on the multi-exposure lines before reading of the exposure amounts of all the single-exposure lines is completed.

20 Claims, 18 Drawing Sheets

(56) References Cited

U.S. PATENT DOCUMENTS

| | | | |
|---|---|---|---|
| 8,253,835 B2 * | 8/2012 | Egawa et al. | 348/308 |
| 8,711,262 B2 * | 4/2014 | Nakano et al. | 348/308 |
| 8,736,711 B2 * | 5/2014 | Chen | 348/228.1 |
| 2006/0102827 A1 * | 5/2006 | Kasuga et al. | 250/208.1 |
| 2009/0021588 A1 * | 1/2009 | Border et al. | 348/208.1 |

* cited by examiner

LIGHT RECEIVER, METHOD AND TRANSMISSION SYSTEM WITH TIME VARIABLE EXPOSURE CONFIGURATIONS

CROSS REFERENCE TO RELATED APPLICATIONS

This application is based upon and claims the benefit of priority from the prior Japanese Patent Application No. 2012-092358, filed on Apr. 13, 2012, the entire contents of which are incorporated herein by reference.

FIELD

Embodiments described herein relate generally to light a receiver, a light reception method and a transmission system

BACKGROUND

A general light receiver photographs a subject one time per unit time. However, in some applications, only a specific area may be photographed several times. In this case, if a time difference between a first photographing timing and a second photographing timing is large, accurate photographing may not be performed due to movement of the subject or the like.

BRIEF DESCRIPTION OF THE DRAWINGS

FIGS. 14A to 14E are diagrams illustrating an example of arrangement of light receiving elements of the light reception module 1 in a light receiver according to the sixth embodiment.

DETAILED DESCRIPTION

In general, according to one embodiment, a light receiver includes a light reception module, a multi-exposure area selector, a multi-exposure controller, and a readout module. The light reception module includes N (N is an integer of 2 or more) lines, each of the N lines having a plurality of light receiving elements. The multi-exposure area selector is configured to select one or a plurality of single-exposure lines to be exposed one time per a unit time and one or a plurality of multi-exposure lines to be exposed a plurality of times per the unit time among the N lines. The multi-exposure controller is configured to, per the unit time, perform an exposure on the single-exposure lines one time for a first exposure time; and a first exposure on the multi-exposure lines for the first exposure time and then a second exposure on the multi-exposure lines for a second exposure time. The readout module is configured to read exposure amounts of the lines line by line. The multi-exposure controller is configured to start the second exposure on the multi-exposure lines before reading of the exposure amounts of all the single-exposure lines is completed.

Embodiments will now be explained with reference to the accompanying drawings.

First Embodiment

Figure 1:
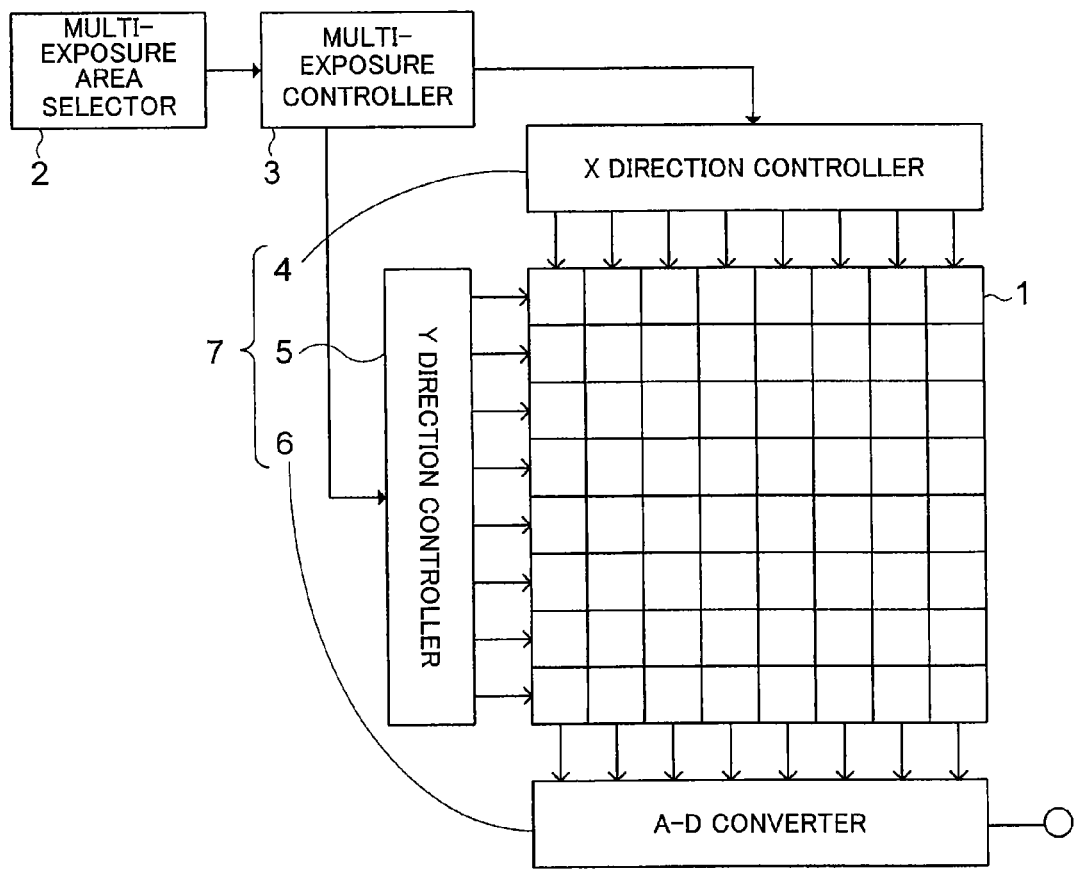
FIG. 1 is a block diagram illustrating a schematic configuration of a light receiver according to a first embodiment.

FIG. 1 is a block diagram illustrating a schematic configuration of a light receiver according to a first embodiment. The light receiver includes a light reception module 1, a multi-exposure area selector 2, a multi-exposure controller 3, an X direction controller 4, a Y direction controller 5, and an AD (Analog to Digital) converter 6.

The light reception module 1 is a CMOS (Complimentary Metal Oxide Semiconductor) sensor, a CCD (Charge Coupled Device) sensor, or the like and includes a plurality of light receiving elements aligned in a matrix shape. More specifically, M light receiving elements and N light receiving elements are aligned in the X (column) direction and the Y (row) direction, respectively. In other words, the light reception module 1 includes N lines, each of which includes M light receiving elements. By exposing each light receiving element, a predetermined range in front of the light reception module 1 can be photographed.

The multi-exposure area selector 2 selects a line (lines) to be exposed one time (hereinafter, referred to as a single-exposure line (lines)) and a line (lines) to be exposed several times at a predetermined unit time (hereinafter, referred to as a multi-exposure line (lines)) from the lines of the light reception module 1. In the present embodiment, the multi-exposure area selector 2 is configured to perform selection based on register settings from an outside. Note that, all the N lines may be set to the single-exposure line or the multi-exposure line, and at least one line may not be exposed at all.

The multi-exposure controller 3 performs first exposure on the single-exposure line for a first exposure time at the above-described unit time. In addition, the multi-exposure controller 3 performs first exposure on the multi-exposure line for the first exposure time and performs second exposure on the multi-exposure line for a second exposure time at the above-described unit time. The second exposure time may be equal to or shorter than the first exposure time. Furthermore, the multi-exposure controller 3 may perform exposure on the multi-exposure line three or more times, and third or latter exposure times are not particularly restricted.

The multi-exposure controller 3 exposes an arbitrary line, for example, by performing a reset operation to discharge stored electric charges. The multi-exposure controller 3 may start exposure of two or more lines simultaneously. In addition, the order of exposure is arbitrary, and it is unnecessary to exposure the lines in the order of the first line to the N-th line.

One of the features of the embodiment is to devise the order of exposure so that a time difference between the first exposure and the second (or latter) exposure of the multi-exposure line is reduced.

The X direction controller 4 designates a column, in the light reception module 1, having the light receiving elements whose exposure amount should be read-out. Furthermore, the Y direction controller 5 designates a row, in the light reception module 1, having the light receiving elements whose exposure amount should be read-out. The AD converter 6 converts the read exposure amount into a digital value and outputs the digital value. The X direction controller 4, the Y direction controller 5, and the AD converter 6 constitute a readout module 7. With respect to the configuration of the readout module 7, although the X direction controller 4 may be configured to designate the entire columns, the light receiving elements of which to be read-out, the Y direction controller 5 can designate only one row. Therefore, the readout module 7 reads-out the exposure amount line by line.

Hereinafter, processing operations of the light receiver will be described in detail.

Figure 2:
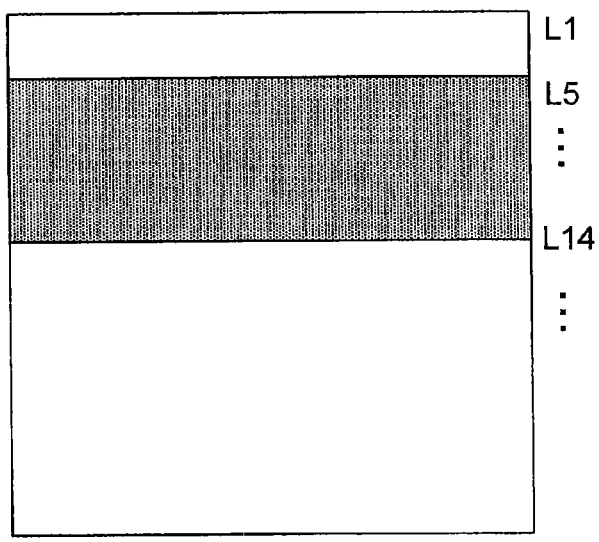
FIG. 2 is a schematic diagram Illustrating the multi-exposure lines selected by the multi-exposure area selector 2.

FIG. 2 is a schematic diagram illustrating the multi-exposure lines selected by the multi-exposure area selector 2. The present embodiment shows an example where, as illustrated in the figure, the fifth line L5 to 14th line L14 are selected as the multi-exposure lines.

Figure 3:
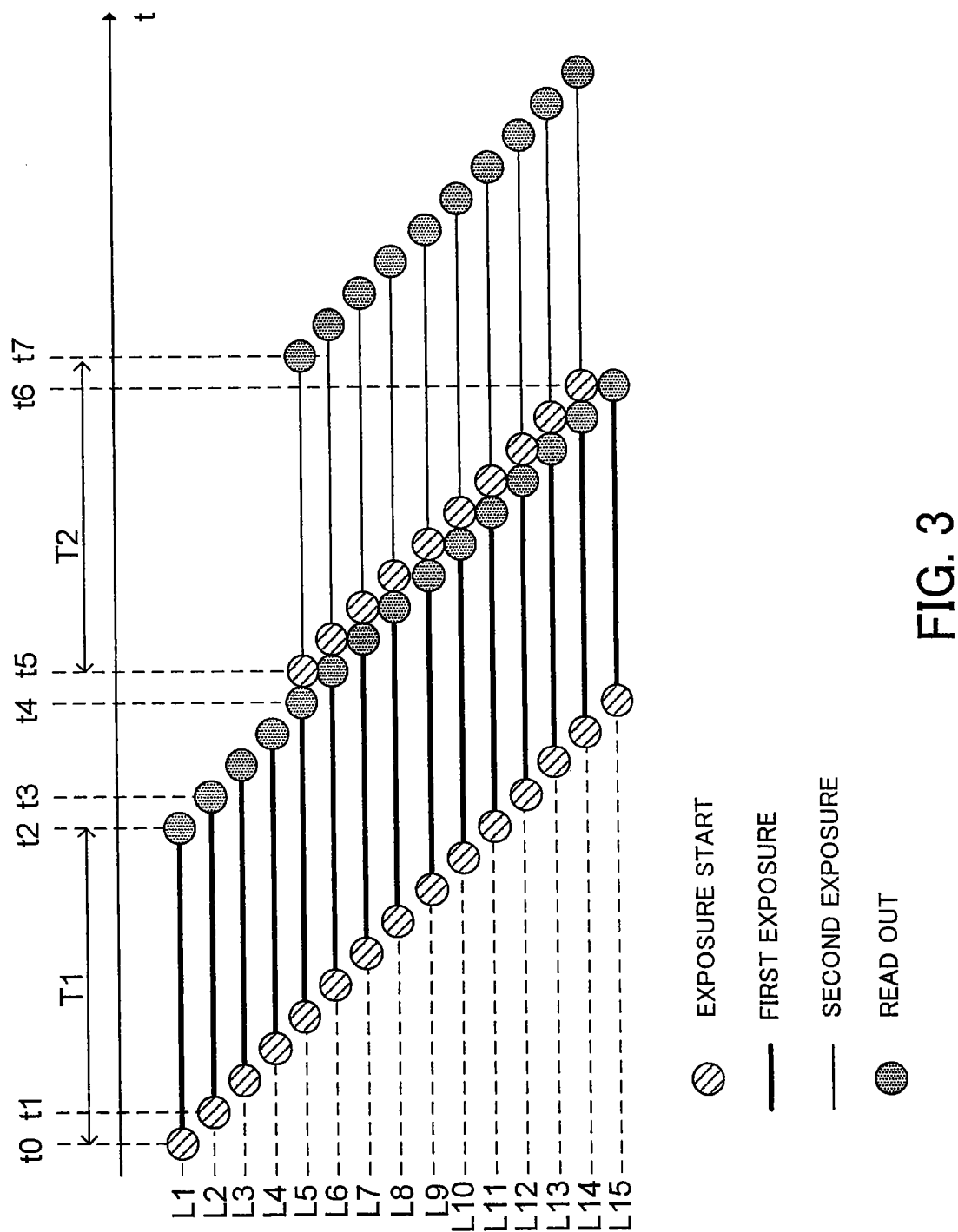
FIG. 3 is a timing diagram illustrating an example of exposure control of the multi-exposure controller 3 and exposure amount readout control of the readout module 7.

FIG. 3 is a timing diagram illustrating an example of exposure control of the multi-exposure controller 3 and exposure amount readout control of the readout module 7. In the figure, it is assumed that the number of lines of the light reception module 1 is 15. The line L5 to line L14 are the multi-exposure lines, and the line L1 to line L4 and L15 are the single-exposure lines. In addition, the figure illustrates an example where the multi-exposure lines are exposed twice.

The multi-exposure controller 3 starts exposure of the line L1, that is, the reset operation is performed at the time to. Next, the multi-exposure controller 3 ends exposure at the time t2 which is after the first exposure time T1 from the time t1. At the same time, at the time t2, the readout module 7 reads the exposure amount of the light receiving elements of the line L1 (hereinafter, simply referred to as "reads the exposure amount of the line L1"). The first exposure time T1 is, for example, 1/30 seconds or 1/60 seconds. In addition, the multi-exposure controller 3 starts exposure of the line L2 at the time t1 later than the time t0. Next, the readout module 7 reads the exposure amount of the line L2 at the time t3 which is after the first exposure time T1 from the time t1.

The reason why the reading time for each line is shifted in this manner is that the readout module 7 performs the reading line by line as described above. The time difference between the time t2 and the time t3 is determined according to a frequency of the reading of the readout module 7.

The exposure and reading are sequentially performed on the lines L1 to L15, and at the time t6, the exposure amount of the line L15 is read. Thus, the reading of the exposure amount of all the single-exposure lines is completed.

Herein, the multi-exposure controller 3 starts the second exposure of at least one multi-exposure line before the time t6 when the reading of all the single-exposure lines is completed. In other words, just after the first reading of the exposure amount of the line L5 at the time t4, that is, at the time t5 which is almost at the same time of the first reading of the exposure amount of the line L6 to be exposed successive to the line L5, the multi-exposure controller 3 starts the second exposure of the line L5. Next, the readout module 7 reads the exposure amount of the line L5 at the time t7 which is after the second exposure time T2 from the time t5.

Similarly, the multi-exposure controller 3 starts the second exposure for the line L6 almost at the same time of the first reading of the exposure amount of the line L7. After that, the reading is sequentially performed on the multi-exposure lines while shifting the exposure starting time.

In this manner as shown in FIG. 3, just after the first exposure amount of the multi-exposure line is read, the second exposure for the same line is started. Therefore, the time difference between the first exposure and the second exposure for the multi-exposure line can be reduced.

Figure 4:
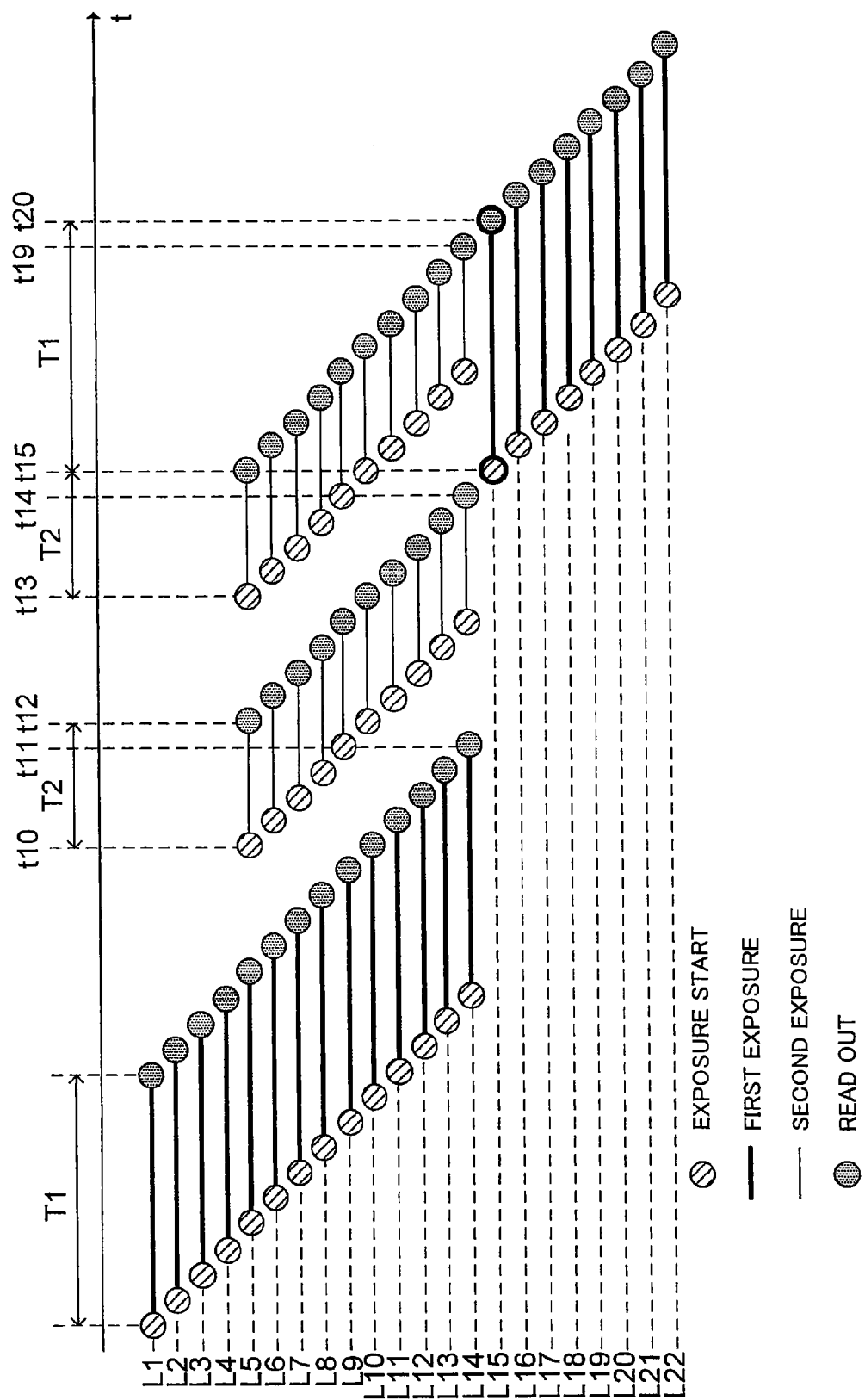
FIG. 4 is a timing diagram illustrating another example of the exposure control of the multi-exposure controller 3 and the exposure amount readout control of the readout module 7.

FIG. 4 is a timing diagram illustrating another example of the exposure control of the multi-exposure controller 3 and the exposure amount readout control of the readout module 7. In the figure, it is assumed that the number of lines of the light reception module 1 is 22. The line L5 to line L14 are the multi-exposure lines, and the line L1 to line L4 and line L15 to line L22 are the single-exposure lines. The figure illustrates an example where the multi-exposure lines are exposed three times.

In FIG. 4, first, exposure and reading are performed on the single-exposure lines L1 to L4. Subsequently, first exposure and reading are performed on the multi-exposure lines L5 to L14.

Next, the multi-exposure controller 3 starts the second exposure of the line L5 at the time t10 before the second exposure time T2 from the time t12 so that the second reading of the exposure amount of the line L5 is performed at the time t12 next to the first reading of the exposure amount of the line L14 at the time t11. After that, the second reading is sequentially performed on the multi-exposure lines L6 to L14 while shifting the exposure starting time.

Next, the multi-exposure controller 3 starts the third exposure of the line L5 at the time t13 before the second exposure time T2 from the time t15 so that the third reading of the exposure amount of the line L5 is performed at the time t15 next to the second reading of the exposure amount of the line L14 at the time t14. After that, the third exposure and reading are sequentially performed on the lines L6 to L14.

Next, the multi-exposure controller 3 starts the exposure of the lines L15 at the time t15 before the first exposure time T1 from the time t20 so that the reading of the exposure amount of the single-exposure line L15 is performed at the time t20 next to the third reading of the exposure amount of the line L14 at the time t19. After that, the reading is sequentially performed on the single-exposure lines L16 to L22 while shifting the exposure starting time.

In this manner, in FIG. 4, exposure and reading are performed on a portion of the single-exposure lines, and after that, first and second (third or latter if necessary) exposure and reading are performed on the multi-exposure lines. Next, exposure and reading are performed on other single-exposure lines. Therefore, the time difference between the first exposure and the second exposure of the multi-exposure line can be reduced.

As described hereinbefore, in the first embodiment, before the reading of the exposure amount of all the lines to be exposed one time is completed, the second exposure of the multi-exposure line is started. As a result, the time difference between the first exposure and the second exposure of the multi-exposure line can be reduced.

Second Embodiment

In the above-described first embodiment, the multi-exposure area selector 2 selects the single-exposure line and the multi-exposure line based on the register settings from an outside. On the contrary, in a second embodiment described hereinafter, the selection is performed based on images obtained as a result of exposure, and at the same time, an image process is performed by using images obtained from exposure amounts of lines on which exposure is performed one time and images obtained from exposure amounts of lines on which exposure is performed several times.

Figure 5:
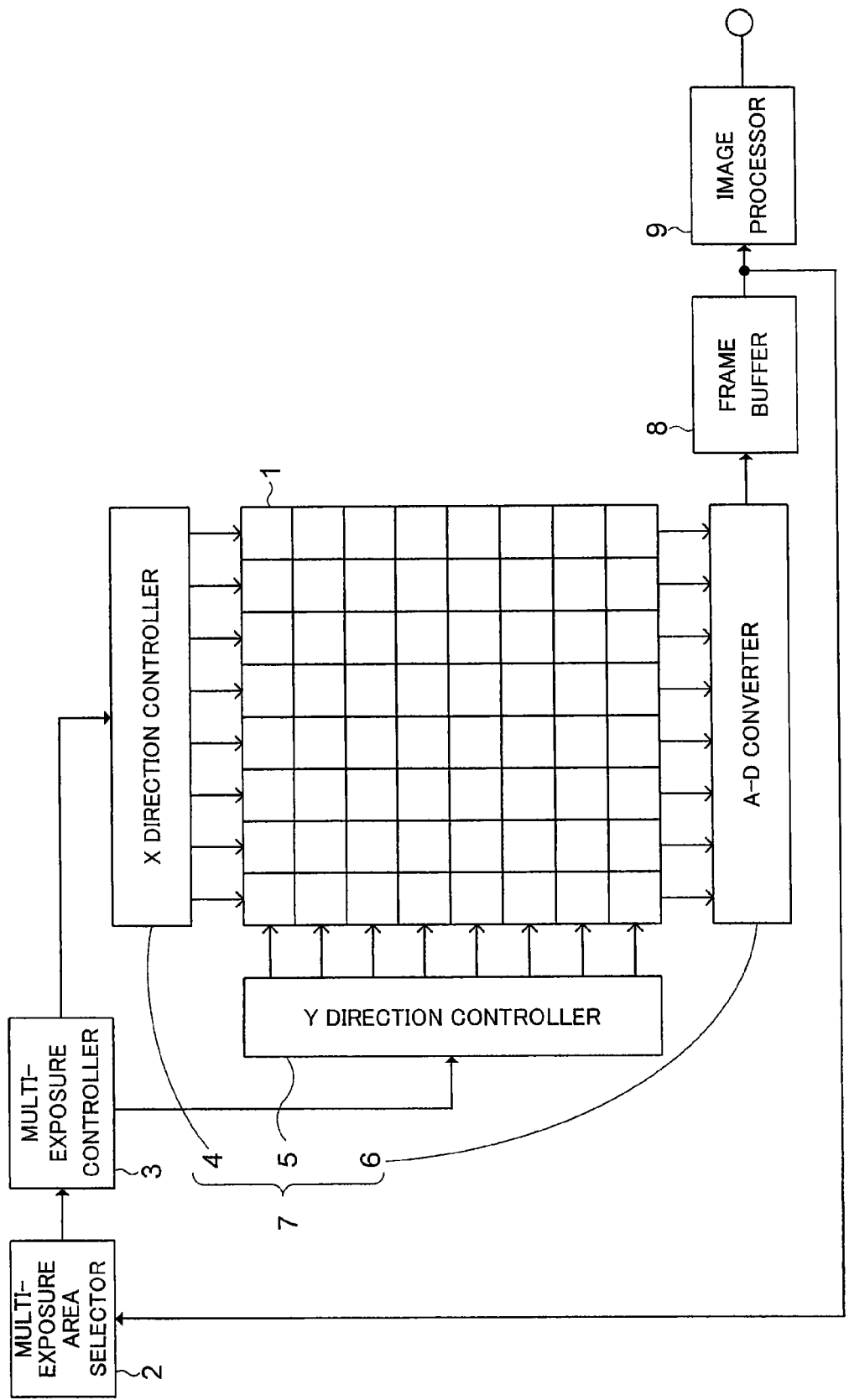
FIG. 5 is a block diagram illustrating a schematic configuration of the light receiver according to the second embodiment.

FIG. 5 is a block diagram illustrating a schematic configuration of the light receiver according to the second embodiment. The differences between the first embodiment and the second embodiment is mainly in that the light receiver further includes a frame buffer 8 and an image processor 9 and in the process of the multi-exposure area selector 2.

The frame buffer 8 generates an image corresponding to the exposure amount read from each line, that is, an image photographed by the light reception module 1 by using the output of the AD converter 6. The image processor 9 performs a predetermined image processing by using the generated image. In addition, in the present embodiment, the multi-exposure area selector 2 selects the single-exposure line and the multi-exposure line by using the image generated by the frame buffer 8.

Figure 6:
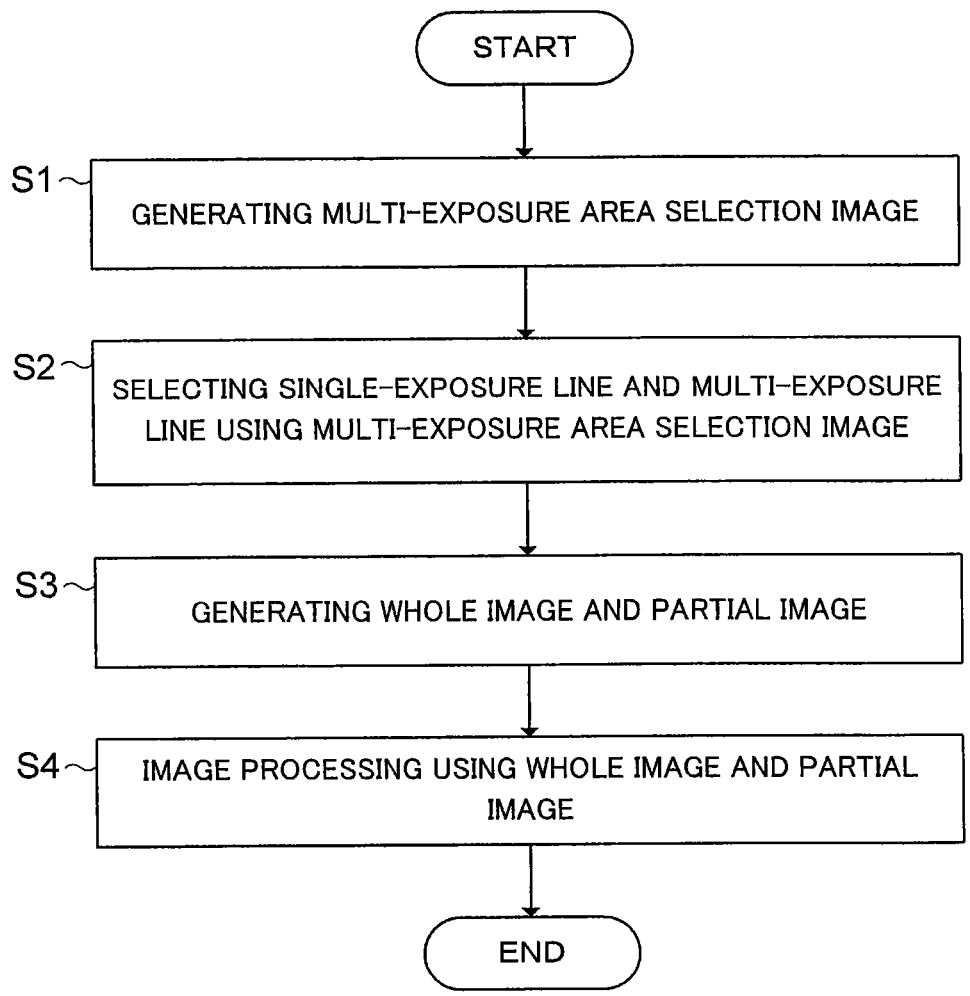
FIG. 6 is a flowchart illustrating an example of the processing operations of the light receiver according to the second embodiment.

FIG. 6 is a flowchart illustrating an example of the processing operations of the light receiver according to the second embodiment.

First, the frame buffer 8 generates an image corresponding to the exposure amount read from each line (Step S1). Herein, similarly to a general case, the generated image is an image corresponding to the exposure amount when all the lines are subjected to the first exposure. Hereinafter, the image generated in Step S1 is referred to as a multi-exposure area selection image. The multi-exposure area selection image is an image generated before a whole image and a partial image described below.

Next, the multi-exposure area selector 2 selects the single-exposure line and the multi-exposure lines from N lines of the light reception module 1 by using the generated multi-exposure area selection image (Step S2).

Then, the multi-exposure controller 3 and the readout module 7 perform exposure and reading described in the first embodiment, and the frame buffer 8 generates a plurality of images corresponding to the exposure amount (Step S3).

One of the plurality of images is an image corresponding to the exposure amount of the single-exposure line and the first exposure amount of multi-exposure line. In other words, the one is an image photographed at the first exposure time. When all the N lines are set to any one of the single-exposure line and the multi-exposure line, the number of pixels of the image is equal to the number of light receiving elements of the light reception module 1, and thus, the number of pixels in the row direction is N. Therefore, for the convenience hereinafter, the image is referred to as a whole image (first image). Note that, when some lines are not exposed, the number of pixels in the row direction is smaller than N. However, even in this case, the image is referred to as a whole image.

In addition, another of the plurality of image is an image corresponding to the second exposure amount of the multi-exposure line. In other words, the image is an image photographed at the second exposure time. The number of pixels of the image in the row direction is equal to the number of the multi-exposure lines. Therefore, for the convenience hereinafter, the image Is referred to as a partial image (second image). Note that, all the lines may be the multi-exposure lines, and in this case, the number of pixels of the partial image in the row direction is N. In this case, the image is also referred to as a partial image. Furthermore, when exposure is performed three or more times, the Image processor 9 may generate three or more images.

Next, if necessary, the image processor 9 performs image processing by using the whole image and the partial image (Step S4).

In this manner, in the second embodiment, the multi-exposure area selection image is generated, and the multi-exposure line Is selected by using the multi-exposure area selection image. Therefore, the multi-exposure line can be automatically selected without manual settings from an outside.

Third Embodiment

A third embodiment is a specific example of the second embodiment. In the present embodiment, face detection is performed, and a noise rejection process is performed.

Figure 7:
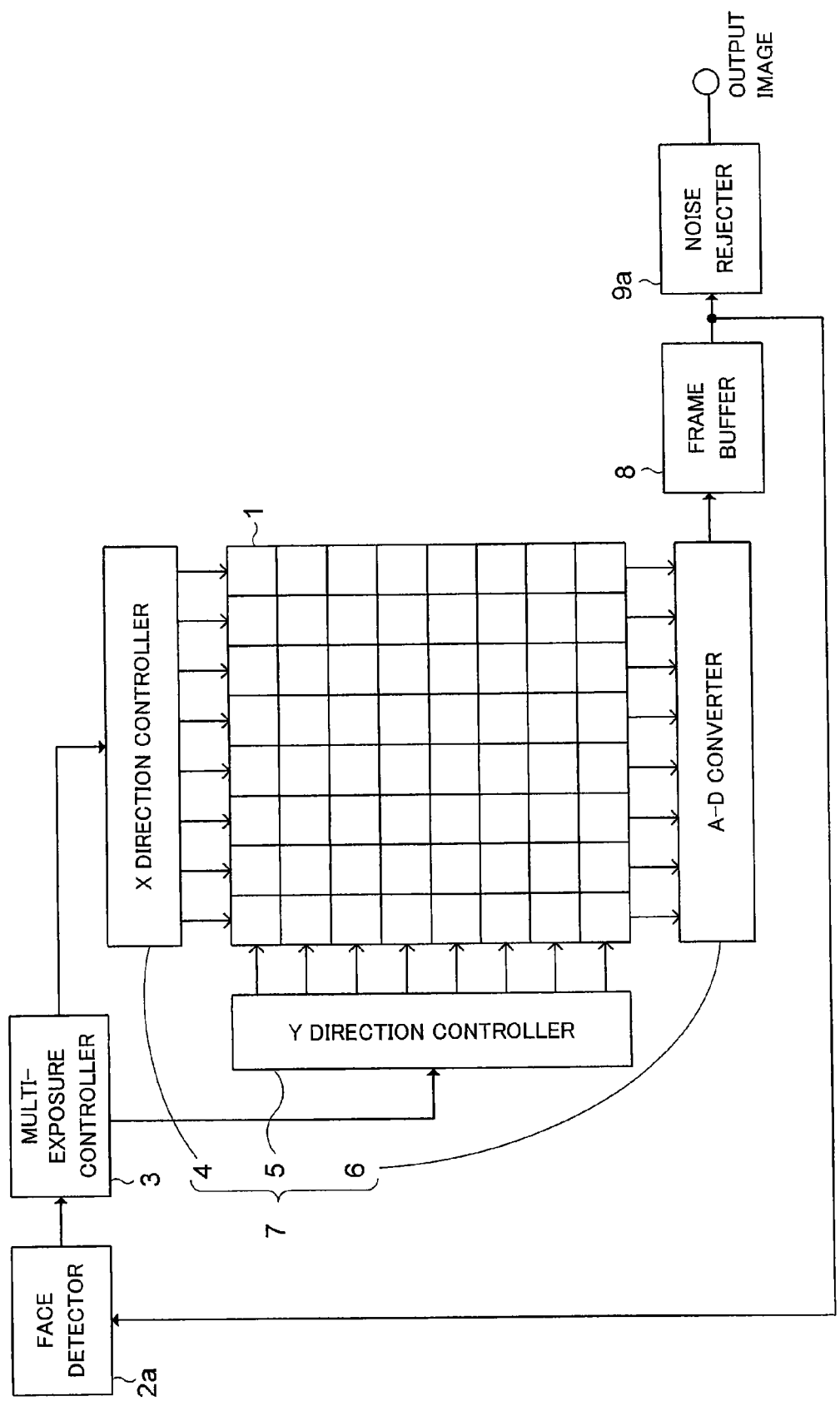
FIG. 7 is a block diagram illustrating a schematic configuration of the light receiver according to the third embodiment.

FIG. 7 is a block diagram illustrating a schematic configuration of the light receiver according to the third embodiment. In the present embodiment, the multi-exposure area selector 2 is a face detector 2a which detects a human face from the multi-exposure area selection image. The face detection is performed by using a known manner. For example, a face is detected based on features of skin color, eyes, nose, and mouth, and the like. In addition, in the present embodiment, the image processor 9 is a noise rejecter 9a which performs a noise rejection process using the whole image and the partial image.

Figure 8:
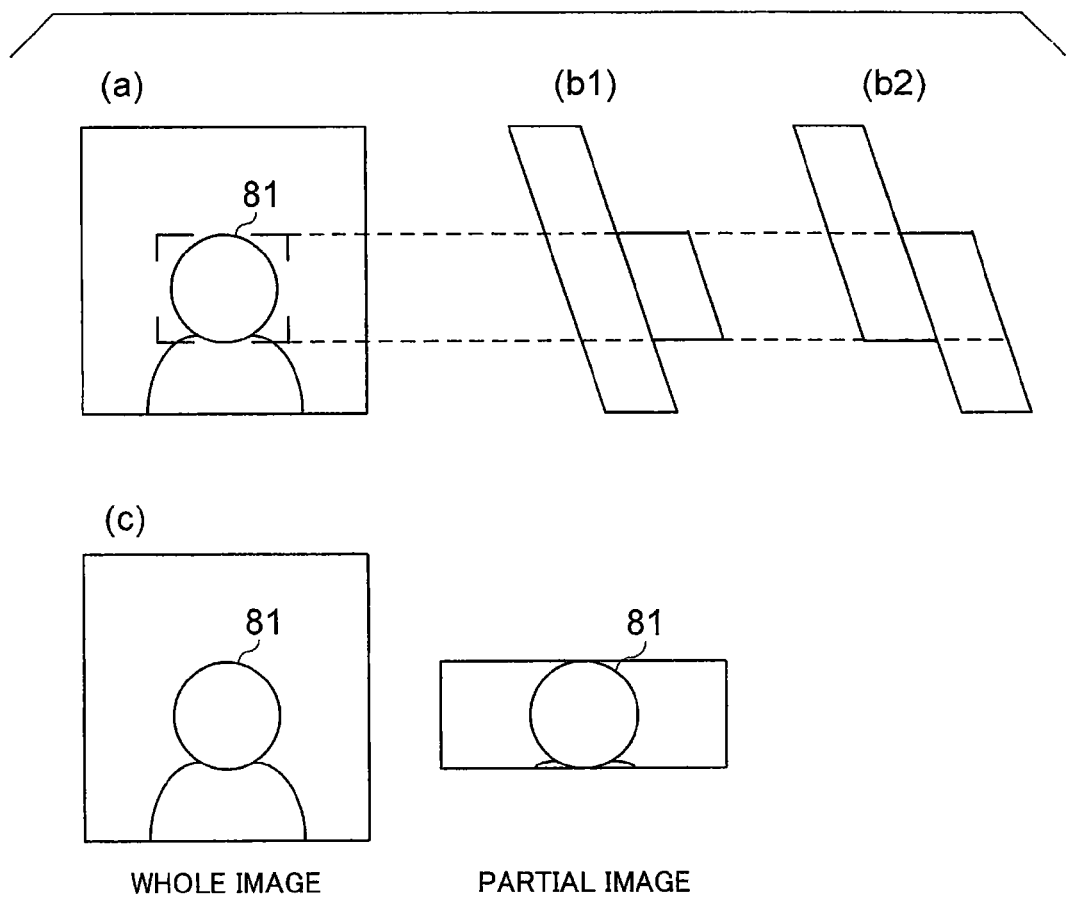
FIG. 8 is a diagram illustrating processing operations of the light receiver of FIG. 7.

FIG. 8 is a diagram illustrating processing operations of the light receiver of FIG. 7.

FIG. 8(a) illustrates an example of the multi-exposure area selection image generated by the frame buffer 8. The face detector 2a detects a face 81 from the multi-exposure area selection image. Next, the face detector 2a determines the lines including the face 81 as the multi-exposure lines and determines the other areas as the single-exposure lines.

FIG. 8(b1) and FIG. 8(b2) are diagrams illustrating timing of exposure control and timing of exposure amount reading control. The multi-exposure controller 3 and the readout module 7 perform exposure and reading described in the first embodiment. Here, FIG. 8(b1) is a diagram schematically illustrating FIG. 3, and FIG. 8(b2) is a diagram schematically Illustrating FIG. 4.

FIG. 8(c) is a diagram illustrating the whole image and the partial image generated by the image processor 9. A noise rejecter 9a performs a three-dimensional (including time direction) noise rejection process such as averaging of the overlapping area, by using the whole image and the partial image to generate an output image.

In this manner, in the third embodiment, a face portion which attracts human attention and where noise can be easily perceived by eyes is photographed several times. Therefore, it is possible to generate an output image a quality of a visually important area in which is particularly high without increasing the processing load of the noise rejecter 9a. In addition, since the difference between the first exposure time and the second exposure time of the lines photographing the face is small, the photographing for the portion image can be performed just after photographing the face for the whole image, thereby, suppressing great movement of the subject between the two images.

Fourth Embodiment

A fourth embodiment is another specific example of the second embodiment. In the fourth embodiment, a HDR (High Dynamic Range) process is performed. The HDR process is a technique for obtaining gradation wider than general gradation by contriving a configuration and operation of a sensor. For example, a wide dynamic range is expressed with limited gradation by combining a plurality of images having different exposure times.

Figure 9:
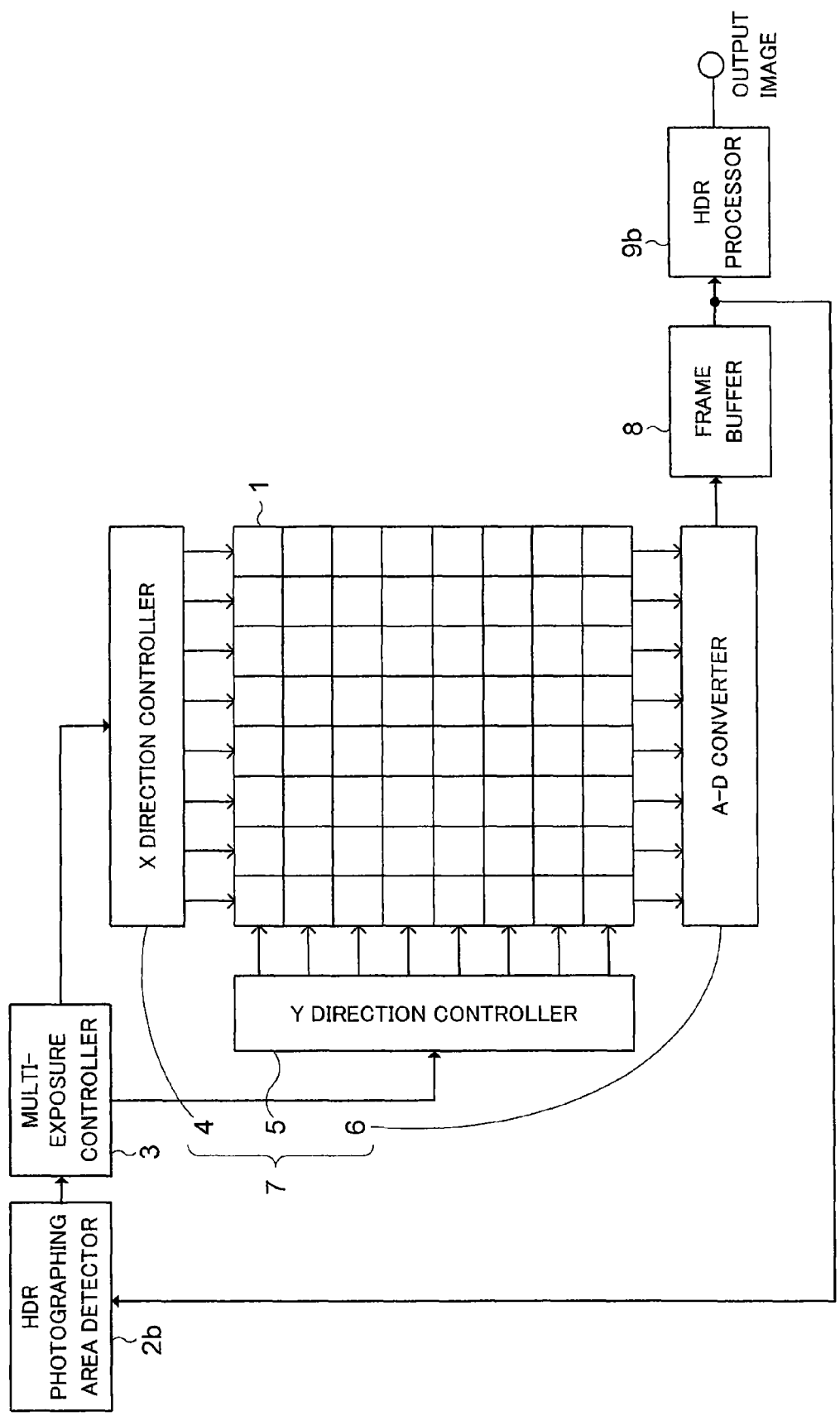
FIG. 9 is a block diagram illustrating a schematic configuration of the light receiver according to the fourth embodiment.

FIG. 9 is a block diagram illustrating a schematic configuration of the light receiver according to the fourth embodiment. In the present embodiment, the multi-exposure area selector 2 is an HDR photographing area detector 2b which detects an area to be HDR-photographed from the multi-exposure area selection image. In addition, in the present embodiment, the image processor 9 is an HDR processor 9b which performs an HDR process.

The HDR photographing area detector 2b detects the lines which should be HDR-photographed based on the luminance of the multi-exposure area selection image and sets the detected lines as the multi-exposure lines.

For example, the HDR photographing area detector 2b can detect the area where pixels having luminance exceeding a predetermined range exist successively or where pixels having luminance exceeding the predetermined range exist with a certain ratio or more, and set the detected lines in the Y direction as the line which should be HDR-photographed. "Exceeding the predetermined range" includes a case where luminance is saturated. The saturated luminance can be detected from the fact that the maximum code or minimum code is outputted from the AD converter 6. Alternatively, similarly to the third embodiment, the HDR photographing area detector 2b detects an important area which is desirable to have a particularly high quality such as a human face, and set the detected lines as the lines which should be HDR-photographed.

Figure 10:
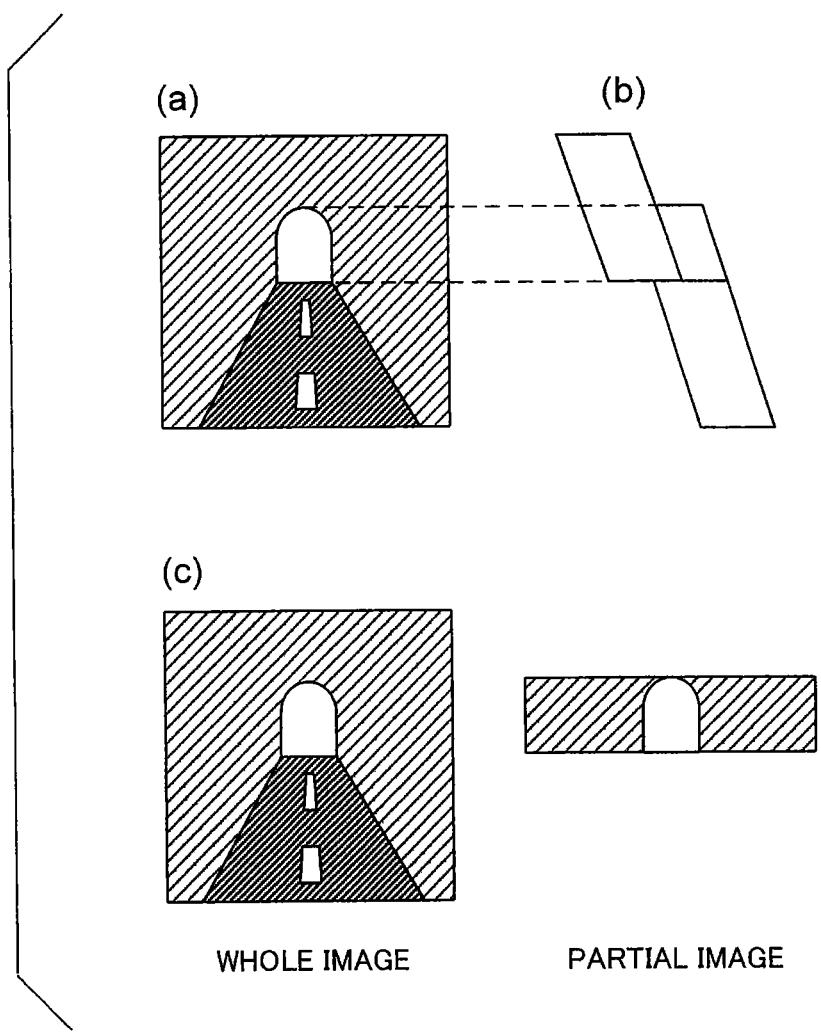
FIG. 10 is a diagram illustrating processing operations of the light receiver of FIG. 9.

FIG. 10 is a diagram illustrating processing operations of the light receiver of FIG. 9. FIG. 10(a) illustrates a scene where an outside of the tunnel is viewed from the inside thereof, in this case, the inside of the tunnel is dim and the outside thereof is bright. Therefore, if the exposure time of the photographing is set long taking the luminance of the inside of the tunnel into consideration, the inside of the tunnel can be appropriately photographed, while white saturation or lack in gradation occurs which may make it difficult to express accurate gradation because the outside of the tunnel is too bright. On the other hand, if the exposure time of the photographing is set short taking the luminance of the outside of the tunnel into consideration, the outside of the tunnel can be appropriately photographed, while black saturation or lack in gradation occurs which may make it difficult to express accurate gradation because the inside of the tunnel is too dark.

Accordingly, the HDR photographing area detector 2b detects the lines corresponding to the outside of the tunnel from the multi-exposure area selection image and sets the detected lines as the lines which should be HDR-photographed, that is, the multi-exposure lines. Next, as illustrated in FIG. 10(b), the multi-exposure controller 3 and the readout module 7 perform the exposure and reading described in the first embodiment. Herein, since the luminance of the inside of the tunnel is higher than the luminance of the outside of the tunnel, the whole image is generated by setting the exposure time for the single-exposure line and the first exposure time for the area which should be exposed several times (this is, the first exposure time) to be long; while the partial image is generated by setting the second exposure time for the multi-exposure line (this is, the second exposure time) to be short (FIG. 10(c)).

Then, the HDR processor 9b performs an HDR process by using the whole image and the partial image. For example, the HDR processor combines two images by using the whole image for the inside of the tunnel and the partial image for the outside thereof. Therefore, it is possible to obtain an image having a high quality without lack in gradation of the inside of the tunnel as well as the outside thereof.

Note that, although an example is shown in FIG. 10 where bright portions of the image are detected and the second exposure is performed for a short time interval, dark portions of the image may be detected and the second exposure may be performed for a long time interval. In addition, although an example is shown in FIG. 10 where a portion of the image is HDR-photographed, the entire image may be HDR-photographed.

In this manner, in the fourth embodiment, the HDR process can be simply and easily implemented by performing multi-exposure.

Fifth Embodiment

In a fifth embodiment, the light receiver is used for visible light communication.

Figure 11:
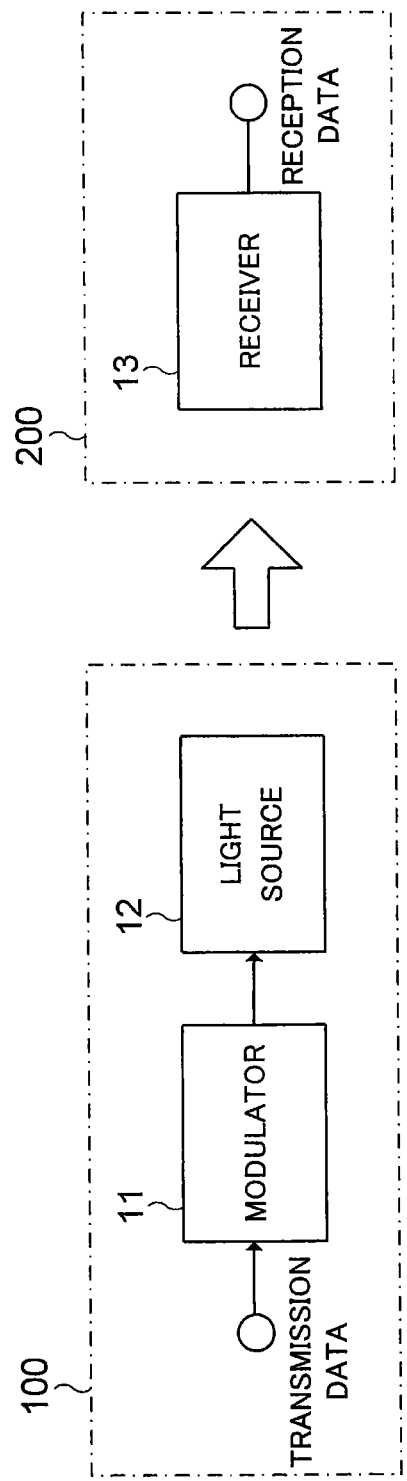
FIG. 11 is a block diagram illustrating a schematic configuration of a visible light communication system.

FIG. 11 is a block diagram illustrating a schematic configuration of a visible light communication system. The visible light communication system transmits data by using a transmitter 100 and a receiver 200. The transmitter 100 includes a modulator 11 and a light source 12. The modulator 11 modulates data to be transmitted with a predetermined frequency to generate a modulation signal. The light source 12 such as an LED (Light Emitting Diode) emits a visible light blinking according to the modulation signal. Note that the transmitter may include a plurality of light sources 12.

Figure 12:
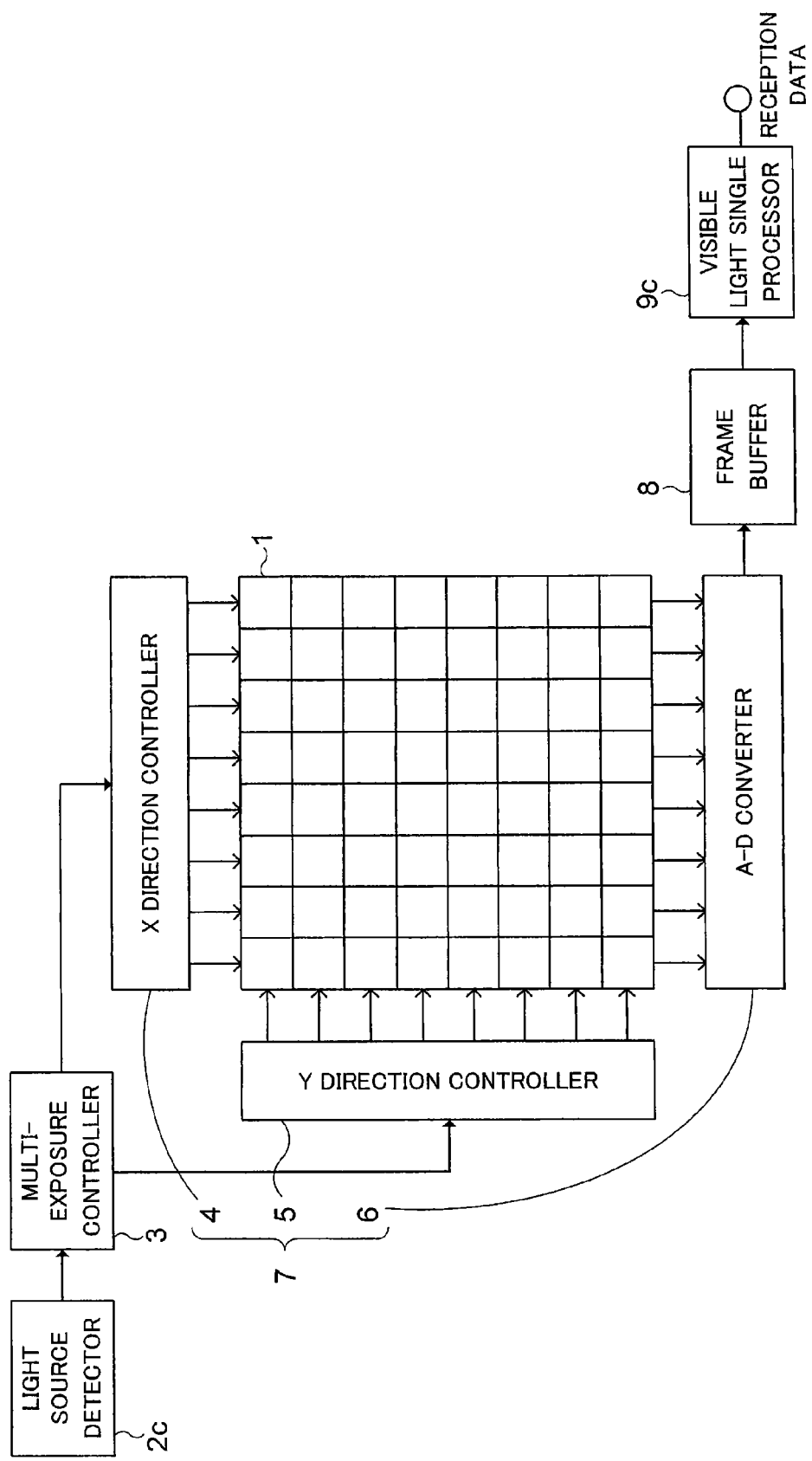
FIG. 12 is a block diagram illustrating a schematic configuration of a light reception module 13 according to the fifth embodiment.

FIG. 12 is a block diagram illustrating a schematic configuration of a light reception module 13 according to the fifth embodiment, which is used for a receiver 200 of FIG. 11.

In the present embodiment, the multi-exposure area selector 2 is a light source detector 2c which detects a position of the light source 12 by using the multi-exposure area selection image generated by the frame buffer 8. The light source detector 2c sets the lines including the detected light source 12 as the multi-exposure lines. For the detection, the position of the light source 12, for example, the light source 12 is allowed to blink according to a synchronization signal having a predefined pattern. Then, the light source detector 2c can detect the position of the light source 12 by searching the pattern.

The light reception module 1 is exposed to the visible light emitted by the light source 12. The readout module 7 reads an exposure amount of each line. The frame buffer 8 generates a plurality of images corresponding to the exposure amount. In the present embodiment, the image processor 9 is a visible light signal processor 9c which performs a demodulation process by using the generated plurality of images. The demodulation process is performed by using the plurality of images, thereby, improving the demodulation accuracy.

Figure 13:
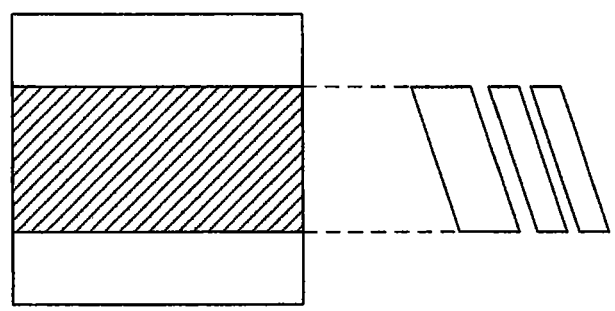
FIG. 13 is a timing diagram showing an example of the exposure control by the multi-exposure controller 3 and the read control by the readout module 7.

The above plurality of images may be the whole image and the partial image described above. Otherwise, the above plurality of images may be ones configured with only the lines including the light source 12 and the vicinity thereof, which are generated by performing the exposure control and the reading control illustrated in FIG. 13. In this case, the whole image may not be generated. Hereinafter, for the convenience, in the case where the whole image is not generated, the plurality of images configured with only the lines including the light source 12 and the vicinity thereof are referred to as crop images. In the case where the embodiment is specialized in visible light communication, as illustrated in FIG. 13, exposure and reading may be performed on only the lines including the detected light source 12 and the vicinity thereof. In this case, the time of the first exposure may be set to be long, and the time of the second or latter exposure may be set to be short.

Hereinafter, embodiments particularly useful for the visible light communication will be described.

Sixth Embodiment

A sixth embodiment relates to arrangement of light receiving elements of a light reception module 1.

FIGS. 14A to 14E are diagrams illustrating an example of arrangement of light receiving elements of the light reception module 1 in a light receiver according to the sixth embodiment. The light reception module 1 includes an R light receiving element, a G light receiving element, a B light receiving element, and a W light receiving element.

Figure 15:
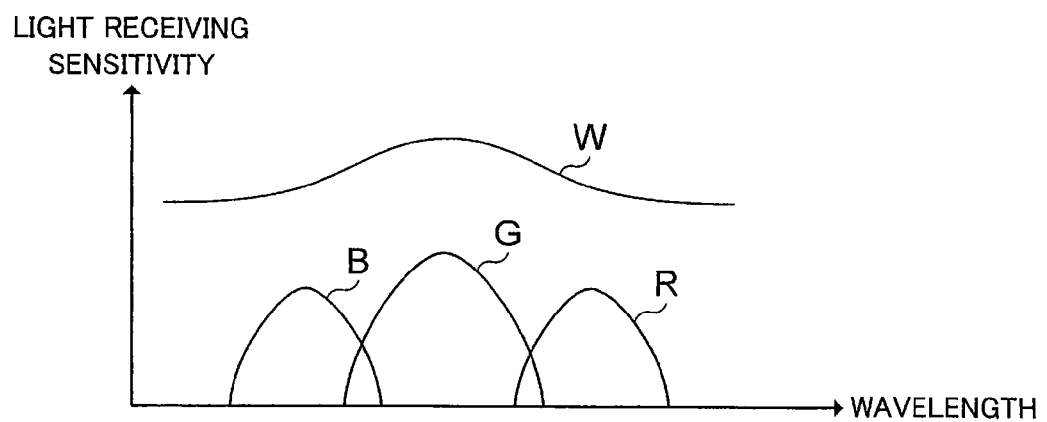
FIG. 15 is a schematic diagram illustrating characteristics of light reception of each light receiving element.

FIG. 15 is a schematic diagram illustrating characteristics of light reception of each light receiving element. As illustrated, the R light receiving element mainly light-receives a light having a wavelength in the vicinity of a predetermined wavelength (first wavelength) corresponding to red among visible lights. The G light receiving element mainly light-receives a light having a wavelength in the vicinity of a predetermined wavelength (second wavelength shorter than the first wavelength) corresponding to green among visible lights. The B light receiving element mainly light-receives a light having a wavelength in the vicinity of a predetermined wavelength (third wavelength shorter than the second wavelength) corresponding to blue among visible lights. The W light receiving element light-receives a light having wavelengths corresponding to red, green, and blue.

The R light receiving element may be implemented, for example, by arranging a color filter, which has high transmittance for red and low transmittance for other colors, above the light receiving element. The G and B light receiving elements are implemented in a similar manner. In addition, the W light receiving element may be configured without arrangement of a color filter thereon. Since the light reception module 1 includes the R, G, and B light receiving elements, it is possible to generate a color image.

Furthermore, as one of the features of the present embodiment, different from general Bayer arrangement, the number of the W light receiving elements is larger than each of the numbers of the R, G, and B light receiving elements. Preferably, the number of the W light receiving elements is equal to the sum of the R, G, and B light receiving elements. By providing a large number of the W light receiving elements which can receive light irrespective of the wavelength, it is possible to improve the sensitivity of the visible light communication. In addition, the numbers of the R, G, and B light receiving elements are not particularly limited. For example, the numbers may be set to be equal to each other, or the number of the G light receiving elements may be set to be larger.

Figures 14A, 14B, 14C, 14D, 14E:
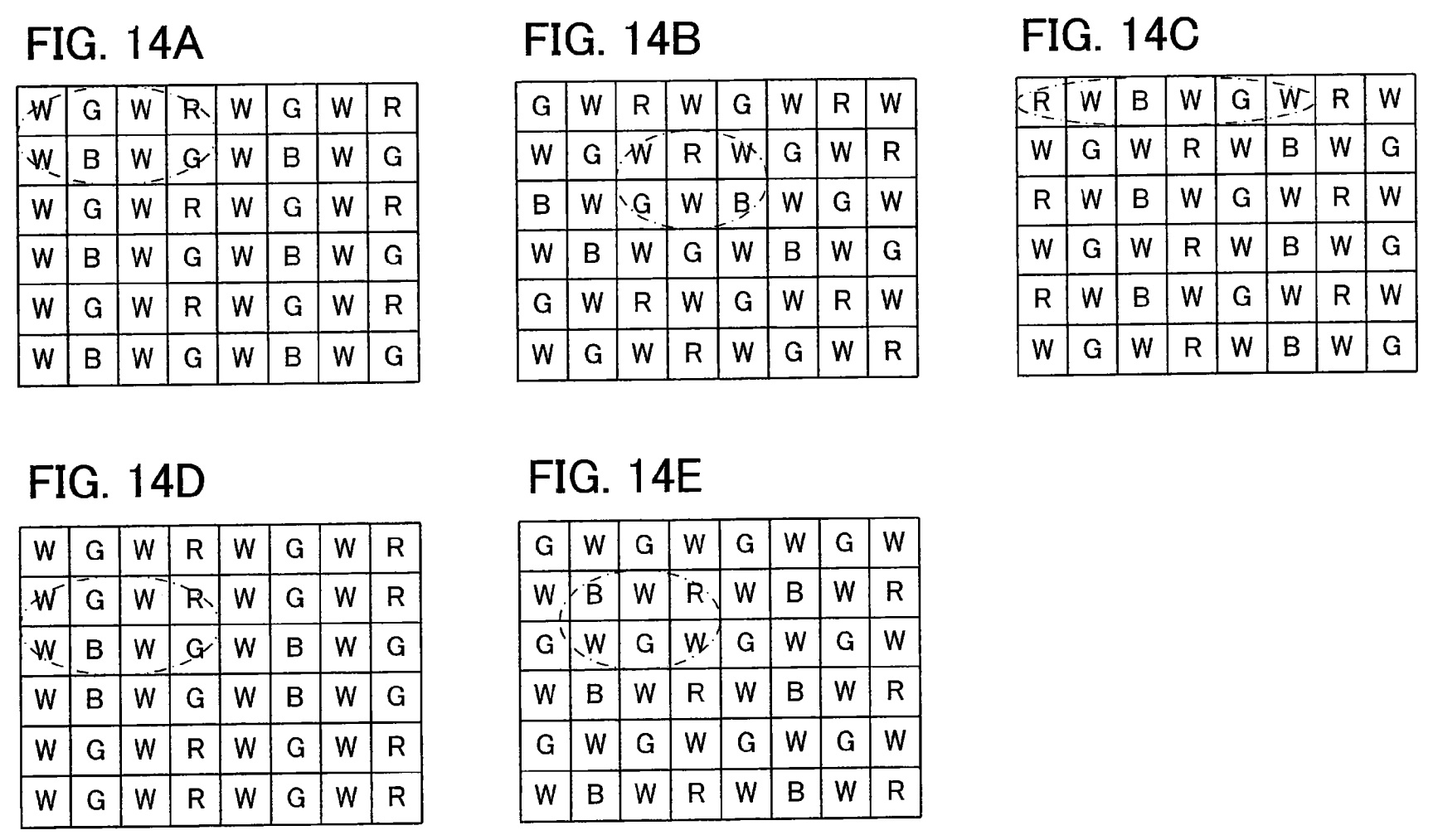

More specifically, a ratio of the numbers of R, G, B, and W light receiving elements is 1:1:1:3 in FIGS. 14A, 14C, and 14D and is 1:2:1:4 in FIGS. 14B and 14E. In addition, FIGS. 14A, 14B, 14D, and 14E are examples of arrangement where successive two lines include R, G, B, and W light receiving elements; and FIG. 14C is an example of arrangement where one line includes R, G, B, and W light receiving elements.

When the whole image (or the first crop image in FIG. 13) is generated, the readout module 7 reads the exposure amount of the R, G, B, and W light receiving elements. Accordingly, general photographing can be performed. On the other hand, when the partial image (or the second or latter crop image in FIG. 13) is generated, the readout module 7 reads only the exposure amount of the W light receiving element under the control of the X direction controller 4. Next, the visible light signal processor 9c performs a demodulation process by using the image corresponding to the exposure amount of the W light receiving element. The W light receiving element can light-receives visible light over the range from a short wavelength to a long wavelength. Therefore, even when the visible light emitted by the light source 12 is dark or even when the light source 12 is at a far distance, it is possible to light-receive the visible light with good sensitivity, which improves accuracy of the demodulation. In addition, by reducing the exposure time interval for generating the partial image or the like, that is, the second exposure time T2 in FIG. 3 or the like, the embodiment can be compatible with the light source 12 which emits a visible light with a high frequency.

As another manner, when the partial image or the like is to be generated, the readout module 7 may read the exposure amounts of the R, G, B, and W light receiving elements, or the read exposure amounts may be added at the same time of reading the exposure amounts. By using the R, G, B, and W light receiving elements, the sensitivity of the light reception can be improved even when the visible light emitted by the light source 12 is relatively long or short. When adding the exposure amounts, one option is to add the exposure amounts of the light receiving elements surrounded by one-dot dashed line of FIG. 14, for example. In other words, as illustrated in FIG. 14C, when the R, G, B, and W light receiving elements are included in one line, the exposure amounts of the light receiving elements in units of (1 column)×(6 rows) may be added. In addition, as illustrated in FIGS. 14A, 14B, 14D, and 14E, when the R, G, B, and W light receiving elements are included in two lines, the exposure amounts of light receiving elements in units of (2 columns)×(3 rows) or (2 columns)×(4 rows) may be added.

In this manner, in the sixth embodiment, the number of the provided W light receiving elements is large. Therefore, when visible light communication is performed, a sensitivity of visible light reception can be improved.

Seventh Embodiment

When visible light communication is performed, it is necessary to obtain not only general images but also images for a demodulation process. Therefore, the data processing amount is increased, which may make it difficult to increase the frame rate of the photographing. Therefore, in the seventh embodiment, the data amount is compressed to be processed.

Figure 16:
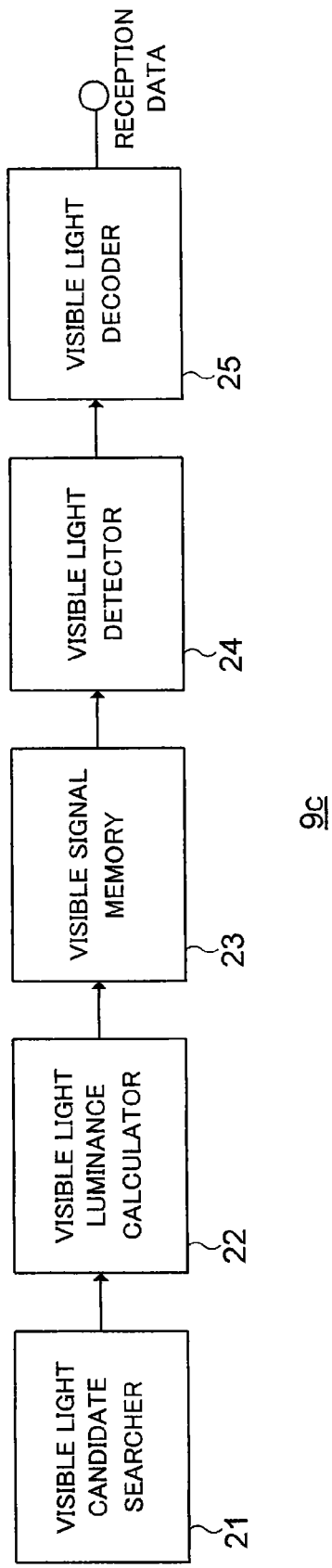
FIG. 16 is a block diagram illustrating an internal configuration of a visible light signal processor 9c of a light receiver according to the seventh embodiment.

FIG. 16 is a block diagram illustrating an internal configuration of a visible light signal processor 9c of a light receiver according to the seventh embodiment. The visible light signal processor 9c includes a visible light candidate searcher 21, a visible light luminance calculator 22, a visible light signal memory 23, a visible light detector 24, and a visible light decoder 25.

Based on the luminance of the first crop image in FIG. 13, the visible light candidate searcher 21 searches candidates of the position of the visible light in the X direction, the visible light being emitted by the light source 12, and outputs the coordinate of the candidate. More specifically, the visible light candidate searcher 21 searches one or a plurality of X coordinates the luminance of which is higher than a predetermined value. The visible light luminance calculator 22 calculates a total value of the luminance in a predetermined range including the X coordinate with respect to each of the X coordinates for each line of the second crop image in FIG. 13 (hereinafter, the total value is simply referred to as the luminance value of the coordinate X).

The visible light signal memory 23 stores the X coordinates and the luminance values of the X coordinates, where the X coordinates and the luminance value thereof are associated with each other, for each line of the second crop image. Based on the luminance values of the X coordinates stored in the visible light signal memory 23, the visible light detector 24 determines whether or not each of the X coordinates is obtained by photographing the visible light of the light source 12, and detects the X coordinate of the visible light among the candidate positions of the visible light. The visible light decoder 25 generates the reception data based on the luminance value of the coordinate X of the detected visible light.

Figure 17:
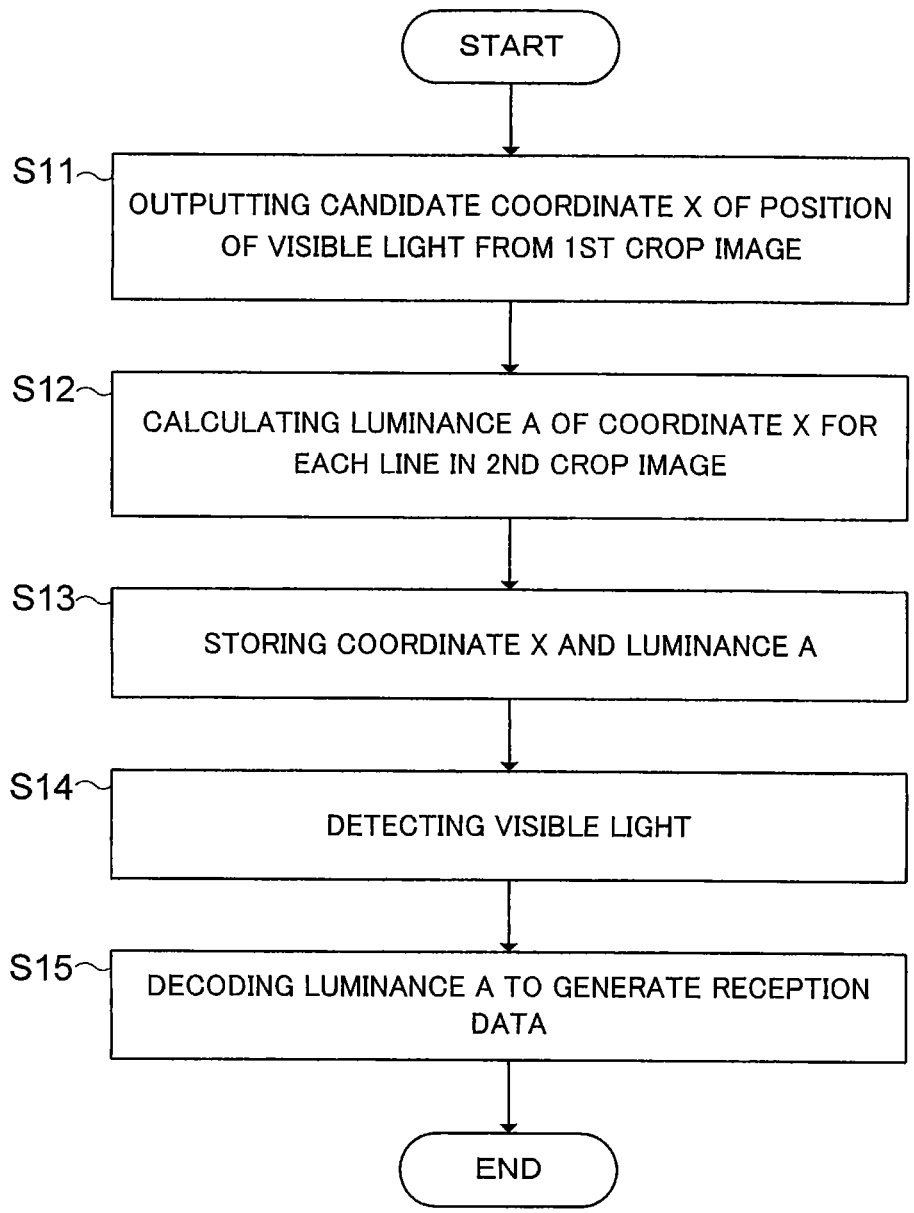
FIG. 17 is a flowchart illustrating an example of processing operations of the visible light signal processor 9c of FIG. 16.

FIG. 17 is a flowchart illustrating an example of processing operations of the visible light signal processor 9c of FIG. 16. In addition, FIG.s 18A and 18B are diagrams illustrating the processing operations of the visible light signal processor 9c of FIG. 16.

Figure 18A:
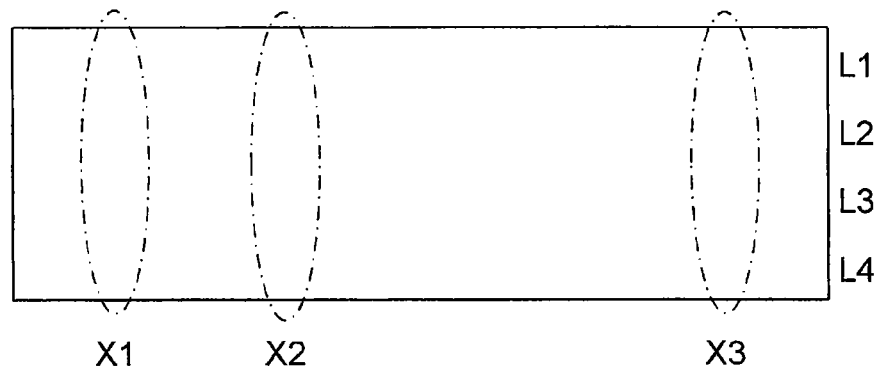
FIGS. 18A and 18B are diagrams illustrating the processing operations of the visible light signal processor 9c of FIG. 16.

First, the visible light candidate searcher 21 outputs the candidate coordinate X of the position of the visible light emitted by the light source 12 based on the luminance of the first crop image (Step S11 of FIG. 17). FIG. 18A schematically illustrates the first crop image configured with four lines L1 to L4. This figure shows an example where coordinates X1, X2, and X3 which are areas having high luminance are set to the candidate coordinates of the visible light.

Figure 18B:
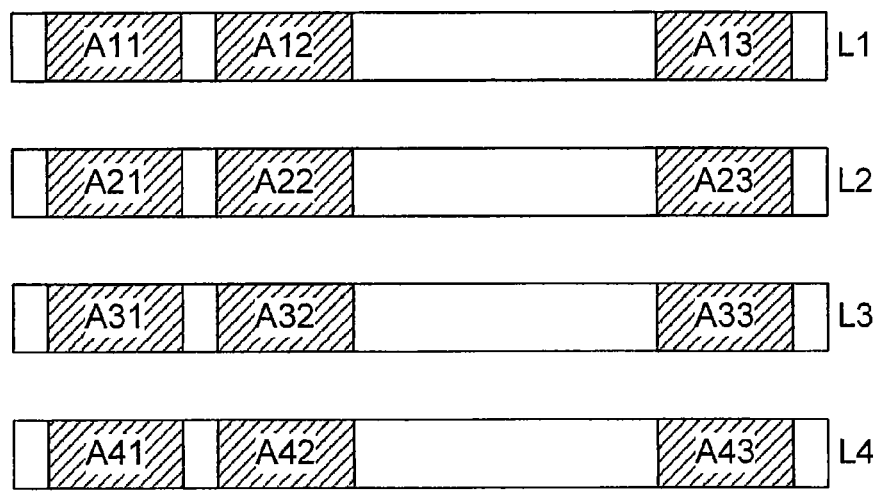

Subsequently, the visible light luminance calculator 22 calculates the luminance value of the coordinate X in each line of the second crop image (Step S12 of FIG. 17). FIG. 18B illustrates each line of the second crop image. In the figure, the luminance value of the coordinate Xk (k=1 to 3) in the line Li (i=1 to 4) is denoted by Aik.

The calculated luminance value Aik of the coordinate Xk in the line Li is stored in the visible light signal memory 23 (Step S13 of FIG. 17). Actually, since the luminance value Aik is calculated line by line, the luminance value Aik of all the second crop image needs to be stored.

Based on the stored luminance value Aik, the visible light detector 24 determines whether or not the coordinate Xi is obtained by photographing the visible light from the light source 12. For example, if the luminance values A1i to A4i of the coordinate Xi include a predefined pattern of a synchronization signal, the visible light detector 24 determines that the visible lights are photographed. Alternatively, the visible light detector 24 may perform determination by examining correctness of the code such as parity check. In this manner, the visible light detector 24 detects where the visible light appear among the coordinates Xi (Step S14). In other words, the visible light detector 24 detects which coordinate X among the candidate coordinates Xi is obtained by photographing the light source 12.

Next, the visible light decoder 25 decodes the luminance value A1i to A4i of the coordinate Xi where the detected visible lights are photographed and generates the reception data (Step S15).

In this manner, in the seventh embodiment, all the second crop images are not used, but only the luminance value of the candidate coordinate of the visible light signal is stored in the visible light signal memory 23 and the process is performed. Therefore, the processing amount of the visible light signal processor 9c can be reduced. In addition to the candidate coordinate of the visible light signal, the information of the luminance value of the coordinate of the peripheral portions thereof is used. Therefore, even when the light source 12 is slightly moved, the reception data can be generated at a high accuracy.

Note that, the whole image may be used instead of the first crop image in FIG. 13, and the partial image may be used instead of the second crop image.

Eight Embodiment

In an eighth embodiment described hereinafter, a sensitivity of second exposure is adjusted based on a first exposure amount.

Figure 19:
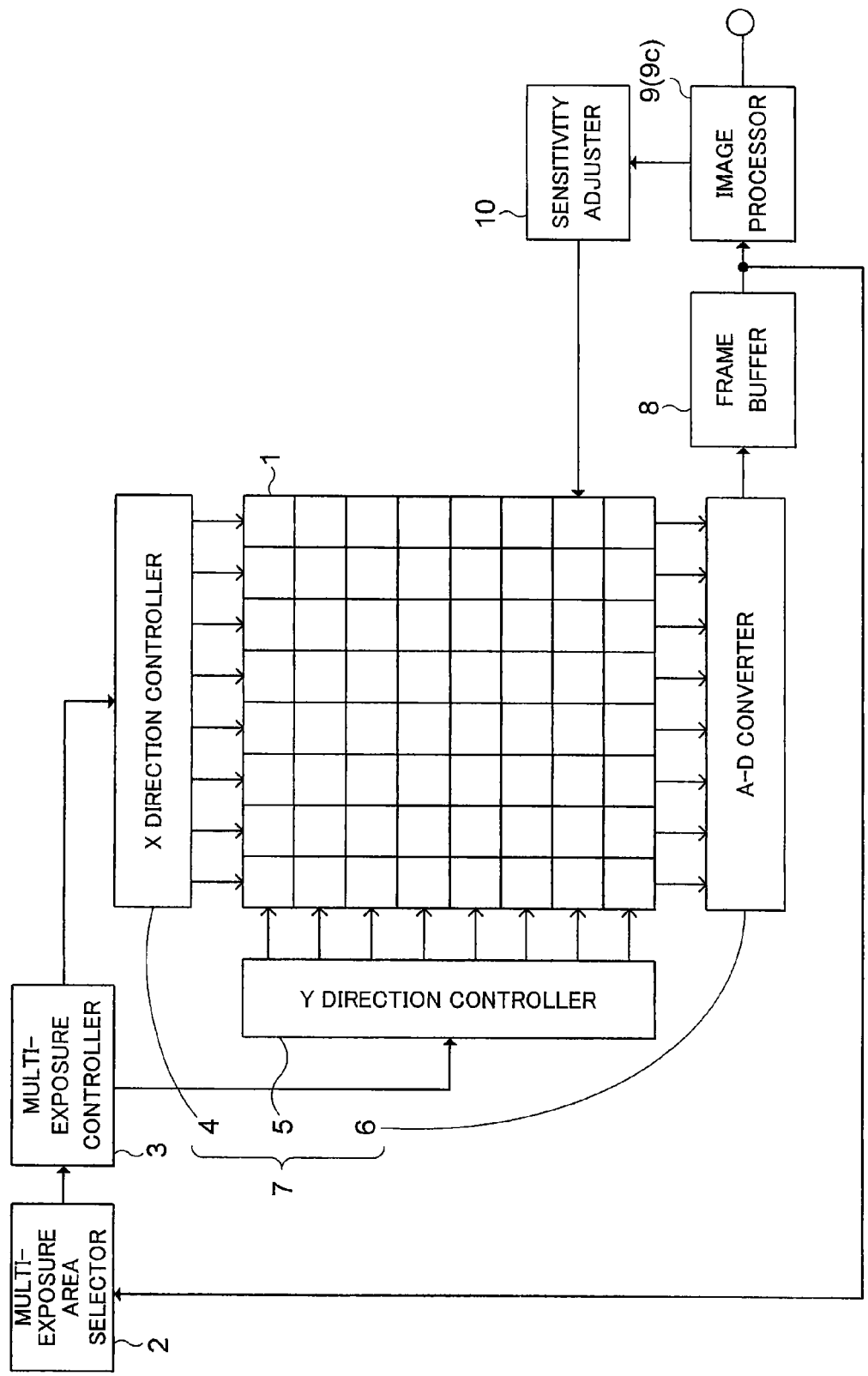
FIG. 19 is a block diagram illustrating a schematic configuration of a light receiver according to the eighth embodiment.

FIG. 19 is a block diagram illustrating a schematic configuration of a light receiver according to the eighth embodiment. In the present embodiment, based on the luminance of the whole image or the first crop image, the image processor 9 determines whether the first exposure amount is proper, excessively large, or deficient. For example, if the maximum value of the luminance of a plurality of lines (for example, 4 lines) or an area (for example, an area of 8×8 pixels) in the image is within a predetermined range, the image processor 9 determines that the exposure amount is proper; if the maximum value of the luminance is higher than the range, the image processor 9 determines that the exposure amount is excessively large; and if the maximum value of the luminance is lower than the range, the image processor 9 determines that the exposure amount is deficient. In addition, the image processor 9 may detect the position of the light source 12 which emits the visible light and may perform the above determination on the area where the light source 12 is photographed.

The light receiver further includes a sensitivity adjuster 10. The sensitivity adjuster 10 adjusts the sensitivity of the second (or third or latter) exposure of the light reception module 1 according to the first exposure amount. For example, when the first exposure amount is excessively large, the sensitivity adjuster 10 decreases the sensitivity by decreasing an analog gain or turning charge addition binning off. On the contrary, when the first exposure amount is deficient, the sensitivity adjuster 10 increases the sensitivity by increasing the analog gain or turning the charge addition binning on.

Moreover, the sensitivity of the third exposure amount may be adjusted based on the second exposure amount.

In this manner, in the eighth embodiment, since the sensitivity of the second exposure is adjusted based on the first exposure amount, the sensitivity of the second exposure can be appropriately set. Therefore, it is possible to perform a process such as a visible light signal process with a high accuracy by using the image corresponding to the second exposure amount.

At least a part of the receiver explained in the above embodiments can be formed of hardware or software. When the receiver is partially formed of the software, it is possible to store a program implementing at least a partial function of the receiver in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the receiver can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A light receiver comprising:
a light reception module comprising N (N is an integer of 2 or more) lines, each of the N lines comprising a plurality of light receiving elements;
a multi-exposure area selector configured to select one or a plurality of single-exposure lines to be exposed one time per a unit time and one or a plurality of multi-exposure lines to be exposed a plurality of times per the unit time among the N lines;
a multi-exposure controller configured to, per the unit time, perform:
an exposure on the single-exposure lines one time for a first exposure time; and
a first exposure on the multi-exposure lines for the first exposure time and then a second exposure on the multi-exposure lines for a second exposure time; and
a readout module configured to read exposure amounts of the lines line by line, wherein
the multi-exposure controller is configured to start the second exposure on the multi-exposure lines before reading of the exposure amounts of all the single-exposure lines is completed.

2. The receiver of claim 1, wherein
the multi-exposure area selector is configured to select a K-th line to a (K+L)-th line (K is an integer satisfying 1≤K≤N and L is an integer satisfying 0≤K+L≤N) as the multi-exposure lines, and
the multi-exposure controller is configured to perform the first exposure on the K-th line to the (K+L)-th line in this order, and to start the second exposure of the K-th line substantially at the same time when the exposure amount of the first exposure of the (K+1)-th line is read.

3. The receiver of claim 1, wherein
the multi-exposure area selector is configured to select a K-th line to a (K+L)-th line (K is an integer satisfying 1≤K≤N and L is an integer satisfying 0≤K+L≤N) as the multi-exposure lines, and
the multi-exposure controller is configured to perform the first exposure on the K-th line to the (K+L)-th line in this order, and to start the second exposure of the K-th line so that the exposure amount of the (K+L)-th line is read and then the exposure amount of the second exposure of the K-th line is read.

4. The receiver of claim 1, wherein the multi-exposure area selector is configured to select the single-exposure lines and the multi-exposure lines according to an external setting.

5. The receiver of claim 1, further comprising a frame buffer configured to generate an image corresponding to the read exposure amounts, wherein
the multi-exposure area selector is configured to select the single-exposure lines and the multi-exposure lines based on the generated image.

6. The receiver of claim 5, wherein
the frame buffer is configured to generate a first image and a second image, the first image corresponding to the exposure amounts of the single-exposure lines and the exposure amounts of the first exposure of the multi-exposure lines, the second image corresponding to the exposure amounts of the second exposure of the multi-exposure lines, and
the receiver further comprises an image processor configured to perform an image processing using the first image and the second image.

7. The receiver of claim 6, wherein
the multi-exposure area selector is configured to detect a face from the image generated by the frame buffer and to select the lines including the detected face as the multi-exposure lines, and
the image processor is configured to perform a noise rejection processing using the first image and the second image.

8. The receiver of claim 6, wherein
the multi-exposure area selector is configured to, based on luminance of the image generated by the frame buffer, select the lines which are to be subjected to a high dynamic range processing as the multi-exposure lines, and
the image processor is configured to perform the high dynamic range processing using the first image and the second image.

9. The receiver of claim 1, wherein
the multi-exposure area selector is configured to select the lines exposed by a visible light from a light source which emits the visible light according to transmission data, as the multi-exposure lines, and
the receiver further comprises a visible light signal processor configured to generate reception data corresponding to the transmission data based on the exposure amounts of the second exposure of the multi-exposure lines.

10. The receiver of claim 9, wherein
the light reception module comprises:
first light receiving elements configured to light-receive a light comprising a wavelength in the vicinity of a first wavelength among a visible light;
second light receiving elements configured to light-receive a light comprising a wavelength in the vicinity of a second wavelength shorter than the first wavelength among a visible light;
third light receiving elements configured to light-receive a light comprising a wavelength in the vicinity of a third wavelength shorter than the second wavelength among a visible lights; and
fourth light receiving elements configured to light-receive lights comprising wavelengths in the vicinity of the first wavelength to the third wavelength, and
a first number of the fourth light receiving elements is larger than a second number of the first light receiving elements, a third number of the second light receiving elements, and a fourth number of the third light receiving elements.

11. The receiver of claim 10, wherein the first number of the fourth light receiving elements is equal to a sum of the second number of the first light receiving elements, the third number of the second light receiving elements, and the fourth number of the third light receiving elements.

12. The receiver of claim 10, wherein the visible light signal processor is configured to generate the reception data based on the exposure amounts of the fourth light receiving elements of the multi-exposure lines.

13. The receiver of claim 10, wherein the visible light signal processor is configured to generate the reception data based on the exposure amounts of the first to fourth light receiving elements of the multi-exposure lines.

14. The receiver of claim 9, further comprising a frame buffer configured to generate an image corresponding to the read exposure amounts, wherein
the visible light signal processor comprises:
a visible light candidate searcher configured to search candidate positions of the visible light from the light source based on luminance of an image corresponding to the exposure amounts of the first exposure of the multi-exposure lines; and
a visible light luminance calculator configured to calculate luminance values in a first range comprising the candidate positions with respect to each of the candidate positions for each of the lines of an image corresponding to the exposure amounts of the second exposure of the multi-exposure lines.

15. The receiver of claim 14, wherein the visible light signal processor comprises:
a visible light signal memory configured to store the luminance values with respect to each of the candidate positions for each of the lines of the image corresponding to the exposure amounts of the second exposure of the multi-exposure lines;
a visible light detector configured to detect a position of the visible light emitted by the light source based on a total value of the stored luminance; and
a visible light decoder configured to generate the reception data based on the luminance value of the detected position of the visible light.

16. The receiver of claim 9, further comprising:
a frame buffer configured to generate an image corresponding to the read exposure amounts; and
a sensitivity adjuster configured to adjust a sensitivity of the light reception module based on luminance of the generated image.

17. A transmission system comprising:
a transmitter comprising a light source configured to emit a visible light according to transmission data; and
a receiver configured to generate reception data corresponding to the transmission data, the receiver comprising:
a light reception module comprising N (N is an integer of 2 or more) lines, each of the N lines comprising a plurality of light receiving elements;
a multi-exposure area selector configured to select one or a plurality of single-exposure lines to be exposed one time per a unit time and one or a plurality of multi-exposure lines to be exposed a plurality of times per the unit time among the N lines;
a multi-exposure controller configured to, per the unit time, perform:
an exposure on the single-exposure lines one time for a first exposure time; and
a first exposure on the multi-exposure lines for the first exposure time and then a second exposure on the multi-exposure lines for a second exposure time;
a readout module configured to read exposure amounts of the lines line by line; and
a visible light single processor configured to generate the reception data corresponding to the transmission data based on the exposure amounts of the second exposure of the multi-exposure lines, wherein
the multi-exposure area selector is configured to select the lines exposed by the visible light from the light source, and
the multi-exposure controller is configured to start the second exposure on the multi-exposure lines before reading of the exposure amounts of all the single-exposure lines is completed.

18. The system of claim 17, wherein
the light reception module comprises:
first light receiving elements configured to light-receive a light comprising a wavelength in the vicinity of a first wavelength among a visible light;
second light receiving elements configured to light-receive a light comprising a wavelength in the vicinity of a second wavelength shorter than the first wavelength among a visible light;
third light receiving elements configured to light-receive a light comprising a wavelength in the vicinity of a third wavelength shorter than the second wavelength among a visible lights; and
fourth light receiving elements configured to light-receive lights comprising wavelengths in the vicinity of the first wavelength to the third wavelength, and
a first number of the fourth light receiving elements is larger than a second number of the first light receiving elements, a third number of the second light receiving elements, and a fourth number of the third light receiving elements.

19. The system of claim 17, wherein the receiver further comprises:
a frame buffer configured to generate an image corresponding to the read exposure amounts; and
a sensitivity adjuster configured to adjust a sensitivity of the light reception module based on luminance of the generated image.

20. A light reception method using a receiver comprising a light reception module comprising N (N is an integer of 2 or more) lines, each of the N lines comprising a plurality of light receiving elements, the method comprising:
selecting one or a plurality of single-exposure lines to be exposed one time per a unit time and one or a plurality of multi-exposure lines to be exposed a plurality of times per the unit time among the N lines;
per the unit time, performing
an exposure on the single-exposure lines one time for a first exposure time; and
a first exposure on the multi-exposure lines for the first exposure time and then a second exposure on the multi-exposure lines for a second exposure time; and
reading exposure amounts of the lines line by line, wherein
performing the exposure starts the second exposure on the multi-exposure lines before reading of the exposure amounts of all the single-exposure lines is completed.

* * * * *